United States Patent
Danilov et al.

(10) Patent No.: US 10,372,605 B2
(45) Date of Patent: Aug. 6, 2019

(54) GENERATIONAL GARBAGE COLLECTOR FOR TREES UNDER MULTI-VERSION CONCURRENCY CONTROL

(71) Applicant: EMC IP Holding Company LLC, Hopkinton, MA (US)

(72) Inventors: Mikhail Danilov, Saint Petersburg (RU); Konstantin Buinov, Leningradskaya (RU); Mikhail Malygin, Saint Petersburg (RU); Kirill Gusakov, Saint Petersburg (RU); Vladimir Prikhodko, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 201 days.

(21) Appl. No.: 15/637,080

(22) Filed: Jun. 29, 2017

(65) Prior Publication Data
US 2018/0181487 A1    Jun. 28, 2018

(30) Foreign Application Priority Data
Dec. 27, 2016    (RU) ................. 2016151317

(51) Int. Cl.
*G06F 17/00* (2019.01)
*G06F 12/02* (2006.01)
*G06F 16/22* (2019.01)
*G06F 3/06* (2006.01)

(52) U.S. Cl.
CPC ............ *G06F 12/0276* (2013.01); *G06F 3/06* (2013.01); *G06F 16/2246* (2019.01); *G06F 2212/1041* (2013.01)

(58) Field of Classification Search
CPC .. G06F 21/56; G06F 11/1407; G06F 11/1453; G06F 16/128; G06F 16/137; G06F 16/152
USPC .......................................................... 707/704
See application file for complete search history.

(56) References Cited

U.S. PATENT DOCUMENTS

2014/0344216 A1* 11/2014 Abercrombie ...... G06F 12/0253
707/609

* cited by examiner

*Primary Examiner* — Truong V Vo
(74) *Attorney, Agent, or Firm* — Womble Bond Dickinson (US) LLP

(57) ABSTRACT

Method of implementing generational garbage collection for trees under MVCC starts by detecting live objects in trees. Trees include normal trees and frozen trees. Poorly-filled young chunks and poorly-filled old chunks of hard-drive memory are identified. Hard-drive memory includes young chunks storing young elements, old chunks storing old elements, and immortal chunks storing immortal elements. One or more old chunks are opened for writes and elements from poorly-filled young chunks and old chunks are copied to one or more opened old chunks. Elements above elements from poorly-filled young chunks and old chunks in the normal trees are updated and stored in the young chunks. One or more immortal chunks are opened for writes and tree leaves of frozen trees from young chunks and from old chunks are copied to one or more opened immortal chunks. All nodes of frozen trees are updated and stored in immortal chunks.

21 Claims, 4 Drawing Sheets

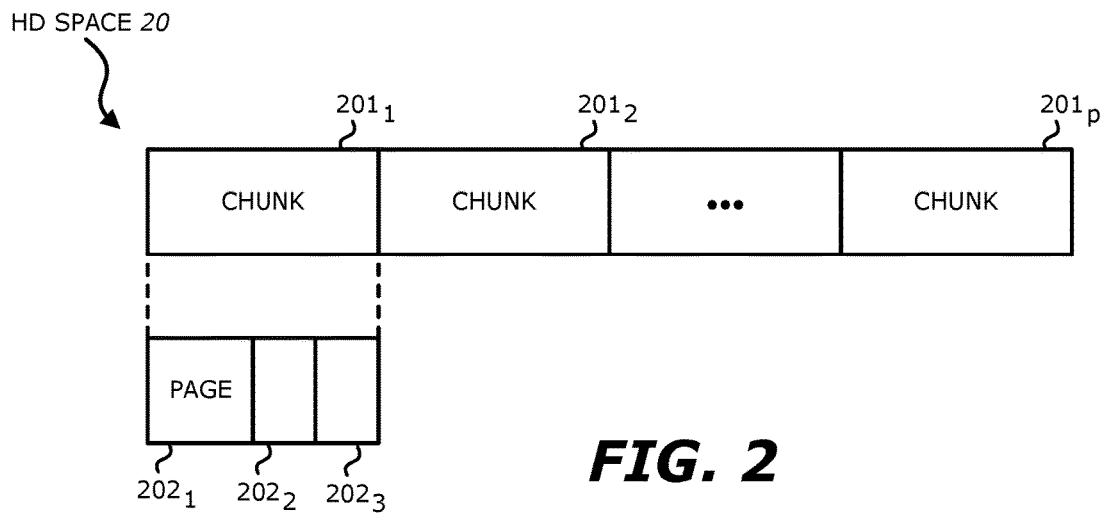

US 10,372,605 B2

GENERATIONAL GARBAGE COLLECTOR FOR TREES UNDER MULTI-VERSION CONCURRENCY CONTROL

CROSS-REFERENCE TO RELATED APPLICATIONS

This application claims priority under 35 U.S.C. § 119 to Russian Patent Application No. 2016151317, filed Dec. 27, 2016, which is incorporated herein by reference in its entirety.

FIELD OF THE INVENTION

Embodiments of the present invention relate generally to data storage systems. More particularly, embodiments of the invention relate to implementing generational garbage collection for trees under multi-version concurrency control.

BACKGROUND

In modern computer systems, a file system stores and organizes computer files to enable a program to efficiently locate and access requested files. File systems can utilize a storage device such as a hard disk drive to provide local access to data.

Some modern computer systems use B+ tree data structures that are search tree implementations. The trees maintained are large and major part of each tree is stored on the hard disk drives. Cluster nodes using multi-version concurrency control policy may share the trees. When data updates are massive, such trees cause severe hard drive space fragmentation. To address this issue, some modern computer systems are using a copying garbage collector to manage the fragmentation problem. However, the current copying garbage collectors are resource demanding processes and thus, there is a desire to make the garbage collector run less frequently and/or do less work.

BRIEF DESCRIPTION OF THE DRAWINGS

Embodiments of the invention are illustrated by way of example and not limitation in the figures of the accompanying drawings in which like references indicate similar elements.

FIG. 2 is a diagram of an example of the hard drive disk space used by one embodiment of the invention.

FIG. 3 is a table illustrating the generational types of elements, chunks, and content according to one embodiment of the invention.

FIG. 4 is a table illustrating the types of trees according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
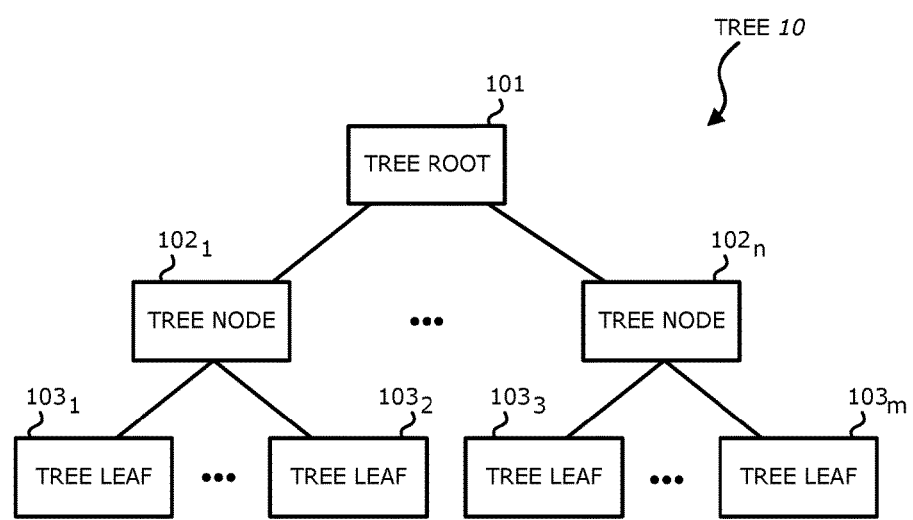
FIG. 1 is a block diagram illustrating an example of one of the trees being processed by one embodiment of the invention.

FIG. 1 is a block diagram illustrating an example of one of the trees being processed by one embodiment of the invention. The tree 10 is a search tree that includes a tree root 101, a plurality of tree nodes $102_1$-$102_n$ (n>1), and a plurality of tree leaves $103_1$-$103_m$ (m>1). In one embodiment, each of the tree nodes $102_1$-$102_n$ include keys and each of the tree leaves $103_1$-$103_m$ include key-value pairs. One example of the tree 10 is the B+ tree data structure. In some embodiments, a single cluster manages thousands the trees 10 because there are multiple system components that use trees to keep or store their information, and there are 128 trees used for each information type in order to keep each particular tree at a reasonable size. While the tree 10 may be large, a major part of each tree 10 resides on hard drives.

FIG. 2 is a diagram of an example of the hard drive disk space (HD space) 20 used by one embodiment of the invention. The hard drive disk space 20 is partitioned into a plurality of chunks $201_1$-$201_p$ (p>1). The chunks $201_1$-$201_p$ are set of blocks of fixed size. Each of the chunks $201_1$-$201_p$ includes at least one page $202_1$-$202_3$. Each page $202_1$-$202_3$ occupies continuous space of a single chunk $201_1$. While FIG. 2 illustrates three pages $202_1$-$202_3$ in chunk $201_1$, it is understood that a number of pages may be included in each of the chunks $201_1$-$201_p$. Each tree element (i.e., tree node $102_1$-$102_n$ or tree leaf $103_1$-$103_m$) is stored in a single page.

In some embodiments, there are groups of trees 10. Each tree 10 can belong to only one group. Trees 10 inside one group can share chunks $201_1$-$201_p$. In other words, one chunk $201_1$ can contain elements of different trees 10 from one group. In one embodiment, content stored in a chunk $201_1$-$201_p$ is modified in append-only mode. When a chunk $201_1$-$201_p$ becomes sufficiently full, it may be sealed. Content of sealed chunks is immutable such that all tree elements in the sealed chunk are immutable. Therefore, trees 10 are under Multi-Version Concurrency Control policy (MVCC). Each tree 10 update means reallocation of at least N pages (N>0), where N is the current depth of the tree 10. In particular, tree root 101 changes after each update.

Given that sealed chunks are immutable, fine-grained reclamation of unused hard drive capacity cannot be implemented. Instead, capacity reclamation is implemented at the chunk level.

One issue with the copying garbage collector for trees arises because the lifetime of tree elements may vary significantly. As shown in FIG. 4, in one system, there may be different types of trees 10 including normal trees and frozen trees. Frozen trees may be included in a geographically distributed environment. Frozen trees are trees 10 that can never be modified. Thus, the lifetime of the elements in a frozen tree is unlimited whereas elements of the normal tree may have a limited lifetime. The problem in current systems is that there are tree elements, which have a longer than in average lifetime (e.g., frozen tree elements), being stored together with new (young) tree elements. As a result, the pages with long-living tree elements are being copied by the garbage collector repeatedly which produces disk and network traffic.

Embodiments of the invention are directed to new garbage collection techniques that efficiently handle trees 10 with elements that may have different lifetime. FIG. 3 is a table illustrating the generational types of elements, chunks, and content according to one embodiment of the invention. In order to implement a generational garbage collector for trees under MVCC and reduce the number of long-living tree elements being copied, the tree elements are segregated into multiple areas by age such that the areas containing older elements may require garbage collection less often. As shown in FIG. 3, the different types of elements (e.g., tree root 101, tree nodes $102_1$-$102_n$, and tree leaves $103_1$-$103_m$) may be young elements, old elements, and immortal elements. The young elements are elements that may predominantly have a short lifetime. In one embodiment, the young elements have a lifetime that is shorter than the old and immortal elements. The old elements are tree elements that have existed for longer than the young elements. The remaining lifetime of the old elements may be more or less significant. The immortal elements are elements of the frozen trees. The lifetime of the frozen trees is unlimited. The frozen trees and their immortal elements are never to be modified.

Referring to FIG. 3, different chunks $201_1$-$201_p$ are used to store the tree elements with different expected lifetime. The chunks $201_1$-$201_p$ may include young chunks that store young elements, old chunks that store old elements, and immortal chunks that store immortal elements. The content of the chunks of each type form content of a young generation, an old generation and an immortal generation.

Figure 5:
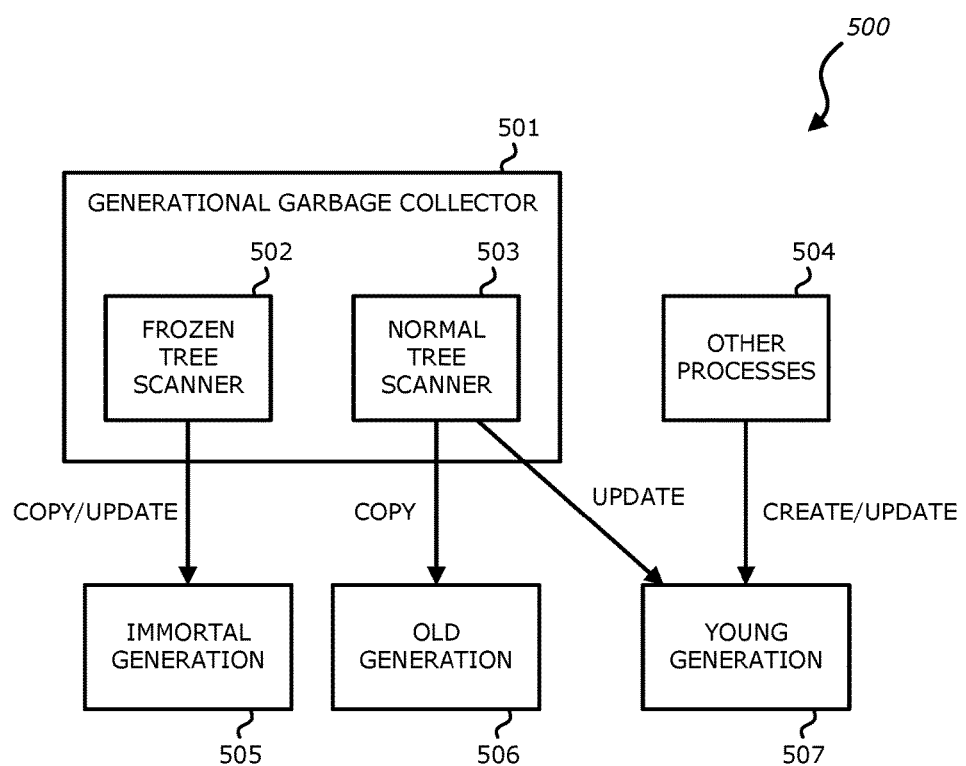
FIG. 5 is a system for implementing generational garbage collection for a plurality of trees under multi-version concurrency control according to one embodiment of the invention.

FIG. 5 is a system 500 for implementing generational garbage collection for a plurality of trees under multi-version concurrency control according to one embodiment of the invention. The system 500 includes a generational garbage collector 501 and other processes 504 that may both be executed by a processor (not shown) to process the immortal generation 505, the old generation 506 and the young generation 507. As discussed above, immortal generation 505, the old generation 506 and the young generation 507 include content that are stored in the respective chunks $201_1$-$201_p$ in a hard drive storage or memory 20 in FIG. 2. While not shown, a processor may also be coupled to the hard drive memory 20. The processor may include multiple processors or a multicore processor, which may permit parallel processing of information. The system 500 may also include a system memory (not shown) coupled to the processor that may have stored therein instructions that may be executed by the processor, to cause the processor to control the elements of the system 500 including the other processes 505 and the generational garbage collector 501. The system memory may also have stored therein instructions, which when executed by the processor, causes the system processor to run an operating system for the system 500. The system memory may include a machine (e.g., a computer) readable storage medium (e.g., read only memory ("ROM"), random access memory ("RAM"), magnetic disk storage media, optical storage media, flash memory devices).

Note that, some or all of the components as shown in FIG. 5 may be implemented as processing logic in software, hardware, or a combination thereof. For instance, the system memory may have stored therein instructions, which when executed by the processor causes the processor to implement generational garbage collection for a plurality of trees under multi-version concurrency control as described herein.

Referring back to FIG. 5, during normal execution, only young chunks included in the hard drive memory 20 are open for writes and thus, all new tree leaves $103_1$-$103_m$ and all new tree nodes $102_1$-$102_n$ belong to the young generation 507 and as such, are stored to young chunks. For instance, when the processor executes the other processes 504, the processes 504 create content that is part of the young generation 507 and stored in the young chunks.

During garbage collection, for each of the trees to be processed in the system 500, the generational garbage collector 501 may process the trees independently and in parallel.

The generational garbage collector 501 includes a normal tree scanner 503 and a frozen tree scanner 502.

The normal tree scanner 503 detects live objects (i.e., tree nodes $102_1$-$102_n$ and tree leaves $103_1$-$103_m$) in a plurality of normal trees via tracing. A live object is an object that is reachable from root of at least one tree. For each tree, the normal tree scanner 503 starts at the root and uses depth-first traversal in order to detect all the objects that are currently reachable, and therefore, live. The normal tree scanner 503 identifies poorly-filled young chunks of hard-drive memory 20 and poorly-filled old chunks of hard-drive memory 20. A young chunk and an old chunk are identified as poorly-filled based on the capacity utilization efficiency and the chunk capacity efficiency utilization threshold that has been set.

In one embodiment, the old chunk capacity efficiency utilization threshold is higher than the young chunk capacity efficiency utilization threshold. The thresholds may be selected in this manner because the expectation is that the speed of tree element rotation is high (i.e., short lifetime) for the young generation. Further, for the old generation, there is a tradeoff between capacity efficiency and workload produced by the garbage collection process. Accordingly, the threshold for the old chunks may be set higher. For example, the old chunk capacity efficiency utilization threshold is 50% of a chunk size and the young chunk capacity efficiency utilization threshold is 25% of the chunk size. In this embodiment, the normal tree scanner 503 determines a capacity efficiency of the young chunks and a capacity efficiency of the old chunks, and marks each of the young chunks having the capacity efficiency lower than a young chunk capacity efficiency utilization threshold (e.g., 25%) as one of the poorly-filled young chunks, and marks each of the old chunks having the capacity efficiency lower than an old chunk capacity efficiency utilization threshold (e.g., 50%) as one of the poorly-filled old chunks.

The normal tree scanner 503 may open for writes one or more old chunks. The one or more old chunks are opened on demand. The normal tree scanner 503 copies elements from poorly-filled young chunks and poorly-filled old chunks to the one or more opened old chunks. As shown in FIG. 5, the normal tree scanner 503 copies and writes to the old generation 506.

As further shown in FIG. 5, the normal tree scanner 503 updates elements above the elements from poorly-filled young chunks and poorly-filled old chunks in the normal trees and stores the updated elements in the young chunks (e.g., update and writes to the young generation 507). For example, when the normal tree scanner 503 copies and writes the content a given tree node, all the nodes above that given tree node to the tree root are to be updated. In this embodiment, these updated elements are considered to be new and thus, stored in the young chunks.

The frozen tree scanner 502 performs in parallel and independently from the normal tree scanner 503. During garbage collection, the frozen tree scanner 502 opens for writes one or more immortal chunks. The immortal chunks are opened on demand. The frozen tree scanner 502 copies the tree leaves $103_1$-$103_m$ of the frozen trees from the young chunks and from the old chunks to the one or more opened immortal chunks. While consolidating the immortal content (i.e., all the tree leaves $103_1$-$103_m$ from frozen trees) that is stored in young chunks and old chunks to the immortal chunks that are opened, the frozen tree scanner 502 does not take into account the young and old chunks' capacity utilization in order to ensure that there is no dead capacity that cannot be reclaimed because of the frozen trees' elements. This allows reducing chunk space fragmentation. The frozen tree scanner 502 then updates and stores all nodes of the frozen trees in the immortal chunks (i.e., copy and updating the immortal generation 505 as shown in FIG. 5).

In one embodiment, when all the trees in system 500 to be processed have been processed, the generational garbage collector 501 may mark the chunks that do not contain any live elements as garbage and their capacity may be reclaimed.

In some embodiments, the frozen trees are not to be updated given the key-value pairs and thus, each of the frozen trees are only scanned once. Accordingly, the generational garbage collector in this embodiment eliminates the endless scanning of the frozen trees and continual copying of long-living tree elements. In one embodiment, the frozen tree scanner 502 may only start its garbage collection process when there are a predetermined number of frozen trees in the system 500 to be processed.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 6:
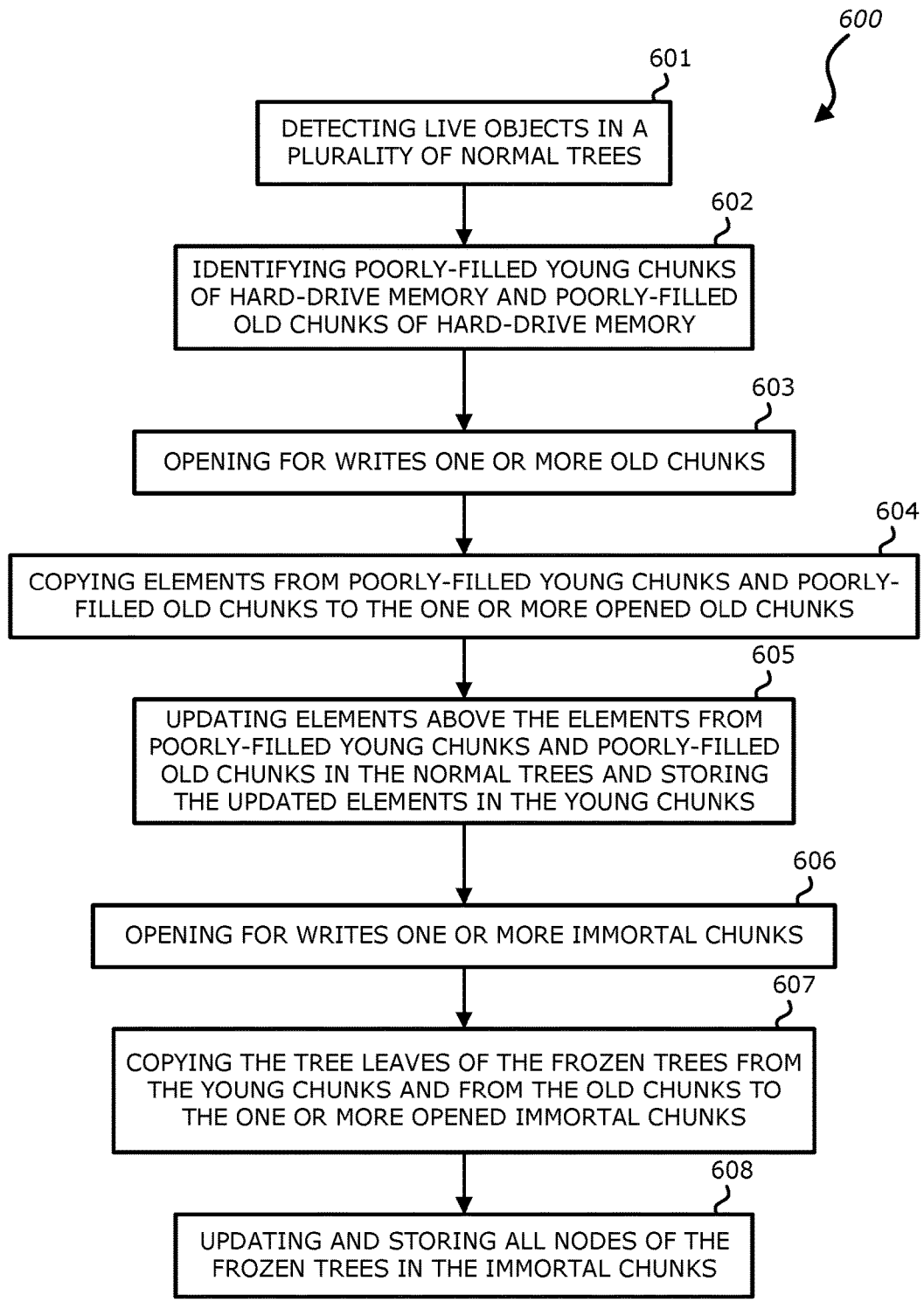
FIG. 6 illustrates an example flow diagram of a process for implementing generational garbage collection for a plurality of trees under multi-version concurrency control according to one embodiment of the invention.

FIG. 6 illustrates an example flow diagram of a process 600 for implementing generational garbage collection for a plurality of trees under multi-version concurrency control according to one embodiment of the invention.

The process 600 starts at Block 601 by detecting live objects in a plurality of normal trees. The plurality of trees include normal trees and frozen trees. Objects, which include tree nodes and tree leaves, are considered to be live objects when the objects are currently reachable. Further, tree elements include objects and tree roots.

At Block 602, poorly-filled young chunks of hard-drive memory and poorly-filled old chunks of hard-drive memory are identified. The hard-drive memory includes a plurality chunks that are fixed-sized blocks of the hard-drive memory. The chunks include the young chunks that store young elements, the old chunks that store old elements, and immortal chunks that store immortal elements.

At Block 603, one or more old chunks are opened for writes and at Block 604, elements from poorly-filled young chunks and poorly-filled old chunks are copied to the one or more opened old chunks.

At Block 604, elements above the elements from poorly-filled young chunks and poorly-filled old chunks in the normal trees are updated and the updated elements are stored in the young chunks. At Block 605, one or more immortal chunks are opened for writes and at Block 606, the tree leaves of the frozen trees from the young chunks and from the old chunks are copied to the one or more opened immortal chunks. At Block 607, all nodes of the frozen trees are updated and stored in the immortal chunks.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system for implementing generational garbage collection for a plurality of trees under multi-version concurrency control, comprising:
   a hard-drive memory including a plurality chunks that are fixed-sized blocks of the hard-drive memory,
      wherein the chunks include young chunks that store young elements, old chunks that store old elements, and immortal chunks that store immortal elements;
   a processor coupled to the hard-drive memory;
   a generational garbage collector coupled to the processor, the generational garbage collector including a normal tree scanner and a frozen tree scanner,
      wherein the plurality of trees include a plurality of normal trees and a plurality of frozen trees,
      the normal tree scanner
         to detect live objects in the plurality of normal trees, wherein objects include tree nodes and tree leaves and are alive when the objects are reachable from a tree root of at least one tree, wherein tree elements include objects and tree roots,
         to identify poorly-filled young chunks of the hard-drive memory and poorly-filled old chunks of the hard-drive memory,
         to open for writes one or more old chunks,
         to copy elements from the poorly-filled young chunks and the poorly-filled old chunks to the one or more opened old chunks,
         to update elements above the elements from the poorly-filled young chunks and the poorly-filled old chunks in the normal trees and to store the updated elements in the young chunks, and
      the frozen tree scanner
         to open for writes one or more immortal chunks,
         to copy the tree leaves of the frozen trees from the young chunks and from the old chunks to the one or more opened immortal chunks, and
         to update and to store all nodes of the frozen trees in the immortal chunks.

2. The system of claim 1, wherein the live objects are detected via tracing, wherein for each tree, starting at the tree root, depth-first traversal is used to detect objects currently reachable.

3. The system of claim 1, wherein the normal tree scanner identifying poorly-filled young chunks and poorly-filled old chunks includes:
   determining a capacity efficiency of the young chunks and a capacity efficiency of the old chunks, and
   marking each of the young chunks having the capacity efficiency lower than a young chunk capacity efficiency utilization threshold as one of the poorly-filled young chunks, and marking each of the old chunks having the capacity efficiency lower than an old chunk capacity efficiency utilization threshold as one of the poorly-filled old chunks.

4. The system of claim 3, wherein the old chunk capacity efficiency utilization threshold is higher than the young chunk capacity efficiency utilization threshold.

5. The system of claim 4, wherein the old chunk capacity efficiency utilization threshold is 50% of a chunk size and young chunk capacity efficiency utilization threshold is 25% of the chunk size.

6. The system of claim 1, wherein the frozen trees are only scanned once.

7. The system of claim 1, wherein the young elements are elements that have a shorter lifetime than the immortal elements.

8. The system of claim 1, wherein the old elements are elements that have existed longer than the young elements.

9. The system of claim 1, wherein the frozen trees are trees that are never to be modified, wherein the lifetime of the frozen tree is unlimited.

10. The system of claim 1, wherein during normal execution, only the young chunks are open for writes, wherein all new tree leaves and tree nodes are young elements stored to young chunks.

11. A method of implementing generational garbage collection for a plurality of trees under multi-version concurrency control, comprising:
   detecting live objects in a plurality of normal trees,
      wherein the plurality of trees include the plurality of normal trees and a plurality of frozen trees,
      wherein objects include tree nodes and tree leaves and are alive when the objects are reachable from a tree root of at least one tree, wherein tree elements include objects and tree roots;
   identifying poorly-filled young chunks of hard-drive memory and poorly-filled old chunks of the hard-drive memory,
      wherein the hard-drive memory includes a plurality chunks that are fixed-sized blocks of the hard-drive memory,
      wherein the chunks include young chunks that store young elements, old chunks that store old elements, and immortal chunks that store immortal elements;
   opening for writes one or more old chunks;
   copying elements from the poorly-filled young chunks and the poorly-filled old chunks to the one or more opened old chunks;
   updating elements above the elements from the poorly-filled young chunks and the poorly-filled old chunks in the normal trees and storing the updated elements in the young chunks;
   opening for writes one or more immortal chunks;
   copying the tree leaves of the frozen trees from the young chunks and from the old chunks to the one or more opened immortal chunks; and
   updating and storing all nodes of the frozen trees in the immortal chunks.

12. The method of claim 11, wherein the live objects are detected via tracing, wherein for each tree, starting at the tree root, depth-first traversal is used to detect objects currently reachable.

13. The method of claim 11, wherein identifying poorly-filled young chunks and poorly-filled old chunks includes:
   determining a capacity efficiency of the young chunks and a capacity efficiency of the old chunks, and
   marking each of the young chunks having the capacity efficiency lower than a young chunk capacity efficiency utilization threshold as one of the poorly-filled young chunks, and marking each of the old chunks having the capacity efficiency lower than an old chunk capacity efficiency utilization threshold as one of the poorly-filled old chunks.

14. The method of claim 13, wherein the old chunk capacity efficiency utilization threshold is higher than the young chunk capacity efficiency utilization threshold.

15. The method of claim 14, wherein the old chunk capacity efficiency utilization threshold is 50% of a chunk size and young chunk capacity efficiency utilization threshold is 25% of the chunk size.

16. The method of claim 11, wherein the frozen trees are only scanned once.

17. The method of claim 11, wherein the young elements are elements that have a shorter lifetime than the immortal elements.

18. The method of claim 11, wherein the old elements are elements that have existed longer than the young elements.

19. The method of claim 11, wherein the frozen trees are trees that are never to be modified, wherein the lifetime of the frozen tree is unlimited.

20. The method of claim 11, wherein during normal execution, only the young chunks are open for writes, wherein all new tree leaves and tree nodes are young elements stored to young chunks.

21. A computer-readable medium having stored thereon instructions, when executed by a processor, causes the processor to perform a method of implementing generational garbage collection for a plurality of trees under multi-version concurrency control, comprising:
   detecting live objects in a plurality of normal trees,
      wherein the plurality of trees include the plurality of normal trees and a plurality of frozen trees,
      wherein objects include tree nodes and tree leaves and are alive when the objects are reachable from a tree root of at least one tree, wherein tree elements include objects and tree roots;
   identifying poorly-filled young chunks of hard-drive memory and poorly-filled old chunks of the hard-drive memory,
      wherein the hard-drive memory includes a plurality chunks that are fixed-sized blocks of the hard-drive memory,
      wherein the chunks include young chunks that store young elements, old chunks that store old elements, and immortal chunks that store immortal elements;
   opening for writes one or more old chunks;
   copying elements from the poorly-filled young chunks and the poorly-filled old chunks to the one or more opened old chunks;
   updating elements above the elements from the poorly-filled young chunks and the poorly-filled old chunks in the normal trees and storing the updated elements in the young chunks;
   opening for writes one or more immortal chunks;
   copying the tree leaves of the frozen trees from the young chunks and from the old chunks to the one or more opened immortal chunks; and
   updating and storing all nodes of the frozen trees in the immortal chunks.

* * * * *